United States Patent
Bala et al.

(10) Patent No.: US 6,307,653 B1
(45) Date of Patent: Oct. 23, 2001

(54) OPTICAL MATRIX PROTECTION SYSTEM

(75) Inventors: Krishna Bala, New York City, NY (US); John Gamelin, Red Bank; W. John Tomlinson, Princeton, both of NJ (US)

(73) Assignee: Tellium, INC, Oceanport, NJ (US)

( * ) Notice: Subject to any disclaimer, the term of this patent is extended or adjusted under 35 U.S.C. 154(b) by 0 days.

(21) Appl. No.: 09/275,413

(22) Filed: Mar. 24, 1999

(51) Int. Cl.[7] .......................... H04B 10/00; H04B 10/08
(52) U.S. Cl. ................................. 359/110; 359/124
(58) Field of Search ........................ 359/117, 124–128, 359/154; 370/218, 219, 220

(56) References Cited

U.S. PATENT DOCUMENTS

| | | | |
|---|---|---|---|
| 4,894,818 | * | 1/1990 | Fujioka ...................................... 370/3 |
| 5,390,178 | * | 2/1995 | Hunter ...................................... 370/63 |
| 5,471,332 | * | 11/1995 | Shiragaki ............................... 359/117 |
| 5,754,320 | * | 5/1998 | Wantanabe ............................ 359/117 |
| 5,838,848 | * | 11/1998 | Laude ...................................... 385/24 |

OTHER PUBLICATIONS

E–TEK Dynamics Data Sheet for a Programable IXN Fiberoptic Swich Module (PFSM).
JDS FITEL Data Sheet for a SV Series Programable IXN Optical Fiber Switch.
JDS FITEL Data Sheet for a SR Series 1:2 Switch Module.
DiCon Fiberoptics, Inc. Data Sheet for a On–Off CD 1×2 Single Mode Switches.
DiCon Fiberoptics, Inc. Data Sheet for a VX500 IXN 2XN Swithces.

* cited by examiner

Primary Examiner—Leslie Pascal
Assistant Examiner—Agustin Bello
(74) Attorney, Agent, or Firm—Morgan, Lewis & Bockius LLP

(57) ABSTRACT

An optical matrix protection system is described. Optical signals that are cross-connected by a N×N matrix switch are routed through alternative protection paths using an optical matrix protection system. The optical matrix protection system includes a N×1 optical switch and a 1×N optical switch. An input port of the 1×N optical switch is coupled to an output port of the N×1 optical switch. Input ports of the N×1 optical switch are connected to a plurality of 1×2 optical switches, which selectively switch input optical signals to either the N×N matrix switch or to the N×1 optical switch. Output ports of the 1×N optical switch are connected to a plurality of 2×1 optical switches, which selectively switch optical signals from either the N×N matrix switch or laid the 1×N optical switch to an output line.

36 Claims, 3 Drawing Sheets

OPTICAL MATRIX PROTECTION SYSTEM

BACKGROUND OF THE INVENTION

1. Field of the Invention

The present invention relates generally to optical matrix switches, and more specifically, to protection mechanisms for optical matrix switches.

2. Discussion of the Related Art

Fiber optic technology has continued to expand across today's data communication networks. Having replaced many of the long-haul connections and other inter-office facilities, fiber optics technology has begun to replace transmission facilities and network elements used in intra-office communication. One of the primary network elements used in intra-office communication is the digital cross-connect. Generally, digital cross-connects link any of several incoming lines to any of several outgoing lines. Today's digital cross-connects switch digital signals on the electrical level. Thus, a fiber optic terminal that receives an optical signal must convert the optical signal to an electrical signal before it sends it to the digital cross-connect.

Optical cross-connects are envisioned as the replacement for the conventional digital cross-connect. Optical cross-connects switch signals at the optical level and therefore obviate the need for optical-to-electrical conversions. The elimination of unnecessary components can lower the overall cost of the network while also increasing the reliability of the network. Reliability is a paramount concern to network planners and bandwidth providers. For optical cross-connects to be considered as viable replacements for digital cross-connects, the optical cross-connects must meet reasonable reliability expectations.

SUMMARY OF THE INVENTION

The present invention addresses the reliability concerns of optical matrix switches by providing an optical matrix protection system that enables a failed path in an optical matrix switch to be re-routed. The optical matrix protection system of the present invention includes a N×1 optical switch and a 1×N optical switch, wherein an input port of the 1×N optical switch is coupled to an output port of the N×1 optical switch.

The inputs to the N×1 optical switch are provided by output ports of a plurality of 1×2 optical switches. The 1×2 optical switches are positioned such that an input port of a 1×2 optical switch is coupled to an input line carrying an optical signal, a first output port of the 1×2 optical switch is coupled to one of N input ports of a N×N switch, and a second output port of the 1×2 optical switch is coupled to one of N input ports of the N×1 optical switch.

The N outputs of the 1×N optical switch are coupled to input ports of a plurality of 2×1 optical switches. The 2×1 optical switches are positioned such that an output port of a 2×1 optical switch is coupled to an output line, a first input port of the 2×1 optical switch is coupled to one of N output ports of the N×N switch, and a second input port of the 2×1 optical switch is coupled to one of N output ports of the 1×N optical switch.

Upon a failure in a path connecting an optical input port and an optical output port of the N×N switch, the failed path is re-routed through the N×1 optical switch and the 1×N optical switch using one of the plurality of 1×2 optical switches and one of the plurality of 2×1 optical switches.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Optical matrix switches will have a valuable role in the continuing evolution of today's communication networks. The replacement of conventional electrical digital cross-connects with optical cross-connects will eliminate some of the unnecessary complexity in connectivity of network elements in an intra-office network. By enabling the switching of signals at the optical level, optical cross-connects will eliminate the need for back-to-back optical-to-electrical and electrical-to-optical conversions. The elimination of these unnecessary functions will significantly lower the overall cost of the network.

Figure 1:
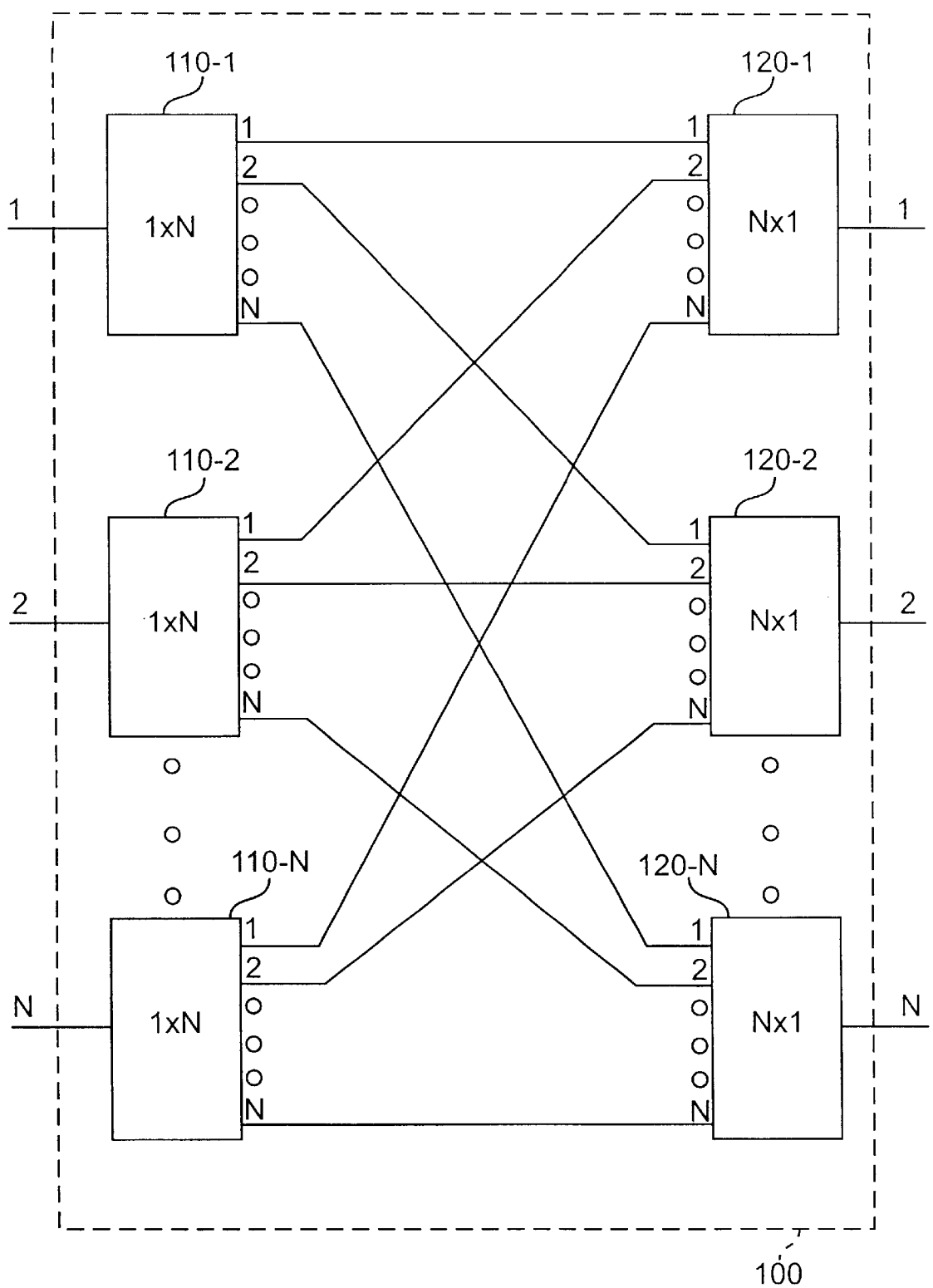
FIG. 1 illustrates an embodiment of an optical matrix switch.

One example of an optical matrix switch is illustrated in FIG. 1. Optical matrix switch 100 is operative to selectively connect any one of N input ports to any one of N output ports. Optical matrix switch 100 includes N 1×N optical switches 110-1 to 110-N and N N×1 optical switches 120-1 to 120-N. The N input ports are connected to the N 1×N optical switches and the N output ports are connected to the N N×1 optical switches. As illustrated in part, input port 1 is connected to 1×N optical switch 110-1, input port 2 is connected to 1×N optical switch 110-2, and input port N is connected to 1×N optical switch 110-3. Similarly, output port 1 is connected to N×1 optical switch 120-1, output port 2 is connected to N×1 optical switch 120-2, and output port N is connected to N×1 optical switch 120-N.

Generally the 1×N and N×1 optical switches are mechanically activated optical switches. These mechanically activated optical switches are programmable and designed to repeatedly connect a single input (output) port to any of N (e.g., 16) output (input) ports. In one embodiment, the 1×N (N×1) optical switches select input/output channels by aligning a common input (output) port with one of the N output (input) ports. The use of collimating lenses improves the insertion loss and repeatability of the optical switch. Control of the 1×N and N×1 optical switches is effected through an electronic interface. An example of a 1×N switch is the SV Series Programmable 1×N Optical Fiber Switch manufactured by JDS Fitel, Inc.

Individual output ports of a 1×N optical switch are connected to one of the N×1 switches. For example, output port 1 of 1×N optical switch 110-1 is connected to input port 1 of N×1 optical switch 120-1, output port 2 of 1×N optical switch 110-1 is connected to input port 1 of N×1 optical switch 120-2, and output port N of 1×N optical switch 110-1 is connected to input port 1 of N×1 optical switch 120-N. Similarly, output port 1 of 1×N optical switch 110-2 is connected to input port 2 of N×1 optical switch 120-1, output port 2 of 1×N optical switch 110-2 is connected to input port 2 of N×1 optical switch 120-2, and output port N of 1×N optical switch 110-2 is connected to input port 2 of N×1 optical switch 120-3.

By using N 1×N optical switches and N N×1 optical switches, it is possible to achieve a N×N switch in which the complexity of the switch is not strongly dependent on N. Since any signal goes through just two optical switches, optical losses for the signal passing through the N×N optical switch can be attractively low. The fiber connectivity, on the other hand, is strongly dependent upon N as $N^2$ fibers are required to connect the N 1×N optical switches and the N N×1 optical switches. Thus for a 16×16 switch having 16 1×16 optical switches and 16 16×1 optical switches, 256 fibers are required to implement the N×N optical switch.

One major concern of optical switch 100 is the reliability of the mechanical actuators that are used to control the switching of the 1×N and N×1 optical switches. Although the 1×N and N×1 optical switches are designed for frequent changes in connectivity, each of the 1×N and N×1 optical switches represent a single point of failure that can disrupt a significant amount of bandwidth traffic. For example, assume that input port 2 of N×N switch 100 is desired to be connected to output port 1 of N×N switch 100. To implement this connection, 1×N optical switch 120 would connect its input port to output port 1 and N×1 optical switch 112 would connect its output port to input port 2. If the mechanical actuator in either 1×N optical switch 110-2 or N×1 optical switch 120-1 fails, the connection between input port 2 and output port 1 of N×N switch 100 will fail.

The consequence of these single points of failures is often unacceptably large. Any single optical fiber can carry bandwidth in the gigabit range. The downtime caused while repair of any one of the 1×N and N×1 optical switches can result in serious consequence in the relationship between a service provider and their bandwidth customers.

Figure 2:
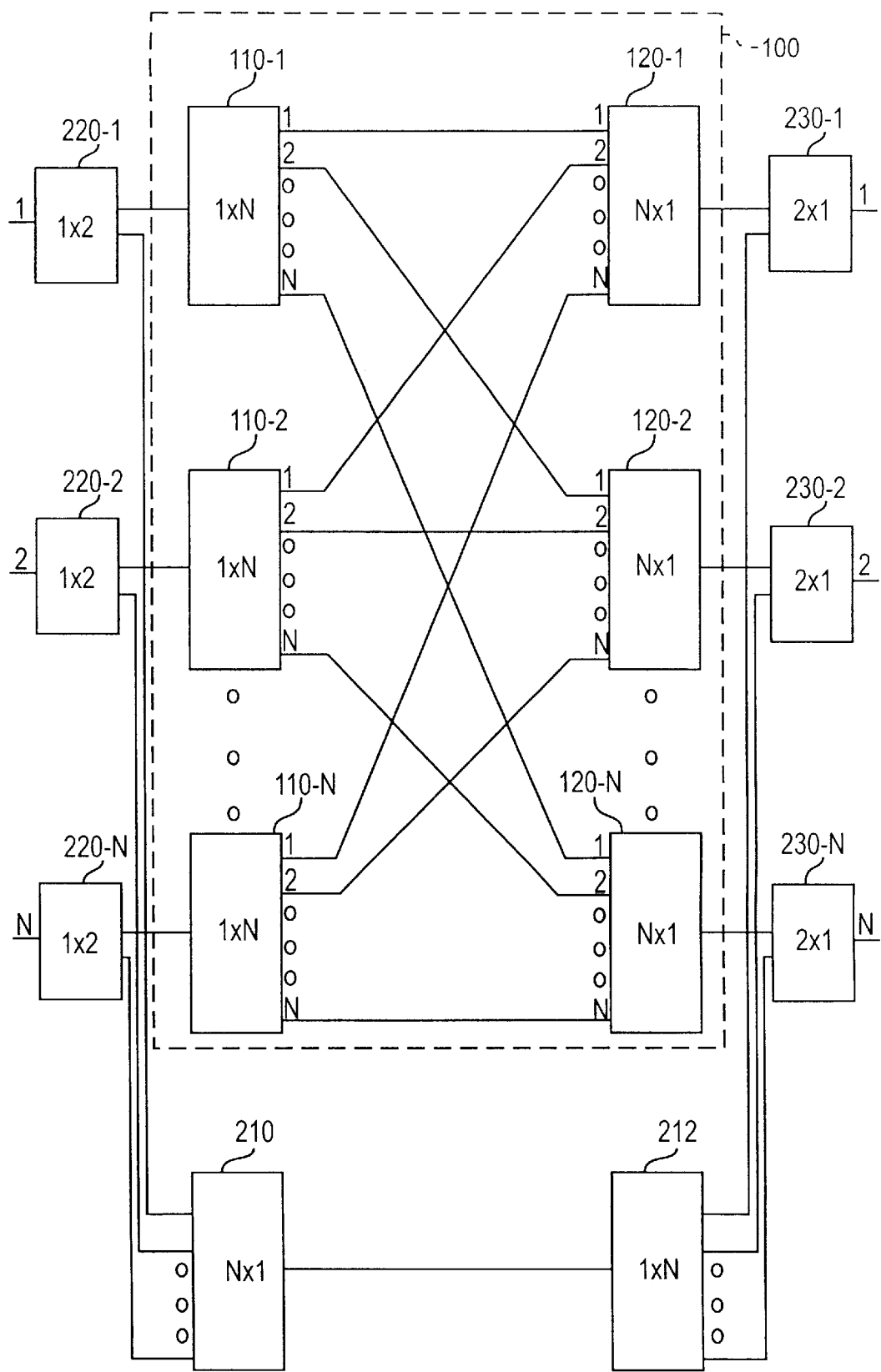
FIG. 2 illustrates an optical matrix protection system according to the present invention.

The present invention provides a protection system for a N×N switch that enables a service provider to repair a failed element within an optical switch without incurring substantial downtime in an affected connection. The optical matrix protection system of the present invention is illustrated in FIG. 2 and is applied to the optical matrix switch 100 described above with reference to FIG. 1.

Optical matrix protection system 200 includes optical matrix switch 100. In addition to the N 1×N optical switches 110-1 to 110-N and the N N×1 optical switches 120-1 to 120-N, optical matrix protection system 200 also includes 1×2 optical switches 220-1 to 220-N, 2×1 optical switches 230-1 to 230-N, N×1 optical switch 210, and 1×N optical switch 212. As will be described below, optical matrix protection system 200 enables an optical signal to be re-routed upon a failure in any one of the optical switches within optical matrix switch 100.

As illustrated, 1×2 optical switches 220-1 to 220-N are connected to the input ports of optical matrix switch 100, while 2×1 optical switches 230-1 to 230-N are connected to the output ports of optical matrix switch 100. More specifically, 1×2 optical switches 220-1 to 220-N are used to selectively connect an input signal to either an input port of optical matrix switch 100 or to an input port of N×1 optical switch 210. In this manner, input signals that are ordinarily sent to an input port of optical matrix switch 100 can be re-routed to N×1 optical switch 210.

N×1 optical switch 210 selectively connects one of its N input ports to the single output port. This single output port is connected to the single input port of 1×N optical switch 212. 1×N optical switch 212 selectively connects its single input port to one of the N output ports. Each of these N output ports are connected to one of the 2×1 optical switches 230-1 to 230-N. 2×1 optical switches 230-1 to 230-N are used to selectively connect one of either an output port of optical matrix switch 100 or an output port of 1×N optical switch 220 to its output port. The output ports of 2×1 optical switches 230-1 to 230-N represent the intended output of optical matrix switch 100.

The following example illustrates the operation of optical matrix protection system 200. In case of a failure on a single path from input port i to output port j of optical matrix switch 100, the 1×2 optical switch connected to input port i and the 2×1 optical switch connected to output port j are switched to re-route the optical signal. The re-routed signal is then carried through input port i of N×1 optical switch 210 and output port j of 1×N optical switch 212. Thus, the optical signal is re-routed from input port i to output port j, bypassing the failed path through optical matrix switch 100.

The provision of a protection path enables a service provider to repair failed optical switch elements in optical matrix switch 100 without incurring substantial downtime. This increase in the reliability of the optical matrix switch 100 is critical in altering the perception of those that are considering inclusion of an optical matrix switch within their network.

It should be noted that the optical matrix protection system of the present invention can also be used in connection with a cross-connect having optical input/output ports and an electrical switch matrix. Although the internal switch matrix would be distinct from the optical matrix switch 100 illustrated in FIG. 1, the provision of a protection path using the optical matrix protection system 200 would be identical.

Figure 3:
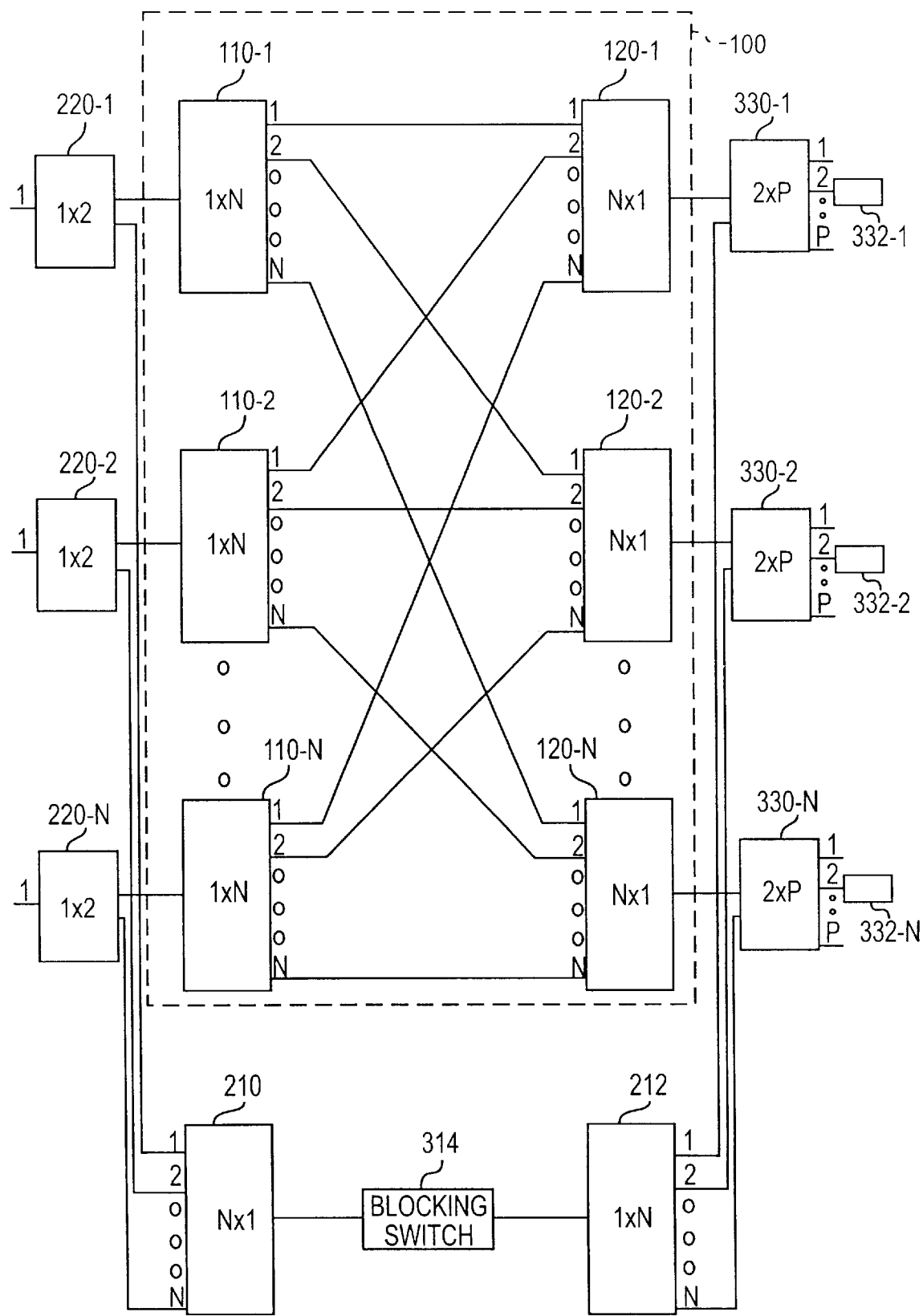
FIG. 3 illustrates an optical matrix protection system according to another embodiment of the present invention.

In addition to providing an alternate protection path for an optical matrix switch, the optical matrix protection system 200 of the present features has additional advantageous features in connection with the maintenance and repair process. First, the 1×2 optical switches 220-1 to 220-N can serve as dumps to prevent signals from being sent to incorrect output ports during switch reconfiguration. Second, the 2×1 optical switches 230-1 to 230-N can be replaced by 2×2 optical switches to effect a detection scheme. The additional output port of the 2×2 optical switches can be used to monitor signal levels before putting a signal on the intended output line. This second feature is illustrated in FIG. 3. FIG. 3 shows 2×P switches 330 which include 2×2 switches. Coupled to the second output port is a signal detector 332 that can be used to monitor the signal level before putting the signal on the output line as discussed above.

Finally, it should be noted that the 1×2 optical switches 220-1 to 220-N and 2×1 optical switches 230-1 to 230-N can also be replaced by optical splitters and combiners. As noted, an advantage of optical matrix switch 100 is that the passage of an optical signal through only two optical switches (i.e., 1×N and N×1) results in low losses. The inclusion of two additional switches (i.e., 1×2 and 2×1) to effect the optical matrix protection system of the present invention results in additional signal loss. This signal loss should be acceptable. However, although the loss characteristics are favorable, the 1×2 optical switches 220-1 to 220-N and 2×1 optical switches 230-1 to 230-N do represent single points of failure. These single points of failure can be reduced using passive optical elements (i.e., optical splitters and combiners) which are not driven by mechanical actuators. Since passive optical elements have greater loss as compared to 1×2 and 2×1 optical switches, there is a tradeoff between reliability and loss characteristics.

The decision to replace 1×2 optical switches 220-1 to 220-N with optical splitters and the decision to replace 2×1 optical switches 230-1 to 230-N with optical combiners are independent decisions. For example, optical switches can be used on one side of optical matrix switch 100 and passive optical components on the other side, If passive components are used on both sides of optical matrix switch 100, the protection path could potentially send signals to incorrect output ports during reconfiguration. Accordingly, in one embodiment as shown in FIG. 3, an optical blocking switch 314 is included in the path between N×1 optical switch 210 and 1×N optical switch 212 to block any incorrect signals during reconfiguration.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An optical matrix protection system, comprising:
   a N×1 optical switch; 1×N optical switch, an input port of said 1×N optical switch being coupled to an output port of said N×1 optical switch;
   a first plurality of optical elements, wherein an $i^{th}$ one of said first plurality of optical elements has an input port coupled to an $i^{th}$ one of a plurality of input lines, a first output port of said $i^{th}$ one of said first plurality of optical elements being coupled to input port i of a N×N switch, a second output port of said $i^{th}$ one of said first plurality of optical elements being coupled to input port i of said N×1 optical switch; and
   a second plurality of optical elements, wherein $j^{th}$ one of said second plurality of optical switches has an output port coupled to $j^{th}$ one of a plurality of output lines, a first input port of said $j^{th}$ one of said second plurality of optical elements being coupled to output port j of said N×N switch, a second input port of said $j^{th}$ one of said second plurality of optical elements being coupled to output port j of said 1×N optical switch,
   wherein upon a failure in a path connecting an optical input port and an optical output port of said N×N switch, said path is rerouted through said N×1 optical switch and said 1×N optical switch using one of said first plurality of optical elements and one of said second plurality of optical elements.

2. The optical matrix protection system of claim 1, wherein said first plurality of optical elements comprises a plurality of 1×2 optical switches, wherein an $i^{th}$ one of said plurality of 1×2 optical switches has an input port coupled to an $i^{th}$ one of said plurality of input lines, a first output port of said $i^{th}$ one of said plurality of 1×2 optical switches being coupled to input port i of said N×N switch, a second output port of said $i^{th}$ one of said plurality of 1×2 optical switches being coupled to input port i of said N×1 optical switch.

3. The optical matrix protection system of claim 1, wherein said first plurality of optical elements comprises a plurality of optical splitters, wherein an $i^{th}$ one of said plurality of optical splitters has an input port coupled to an $i^{th}$ one of said plurality of input lines, a first output port of said $i^{th}$ one of said plurality optical splitters being coupled to input port i of a N×N switch, a second output port of said with one of said plurality of optical splitters being coupled to input port i of said N×1 optical switch.

4. The optical matrix protection system of claim 1, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

5. The optical matrix protection system of claim 1, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

6. The optical matrix protection system of claim 2, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

7. The optical matrix protection system of claim 2, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

8. The optical matrix protection system of claim 3, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

9. The optical matrix protection system of claim 3, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

10. The optical matrix protection system of claim 1, wherein said N×N switch is a N×N optical matrix switch.

11. The optical matrix protection system of claim 10, wherein said N×N optical matrix switch comprises N 1×N optical switches and N N×1 optical switches, wherein output ports of said 1×N optical switches are coupled to input ports of said N×1 optical switches.

12. The optical matrix protection system of claim 1, wherein said N×N switch is an electrical switch having optical input and output ports.

13. The optical matrix protection system of claim 4, wherein said 2×P optical matrix switches are 2×1 optical matrix switches.

14. The optical matrix protection system of claim 4, wherein said 2×P optical matrix switches are 2×2 optical matrix switches, wherein a second output port of a 2×2 optical matrix switch is coupled to a signal detector.

15. The optical matrix protection system of claim 7, further comprising a blocking switch positioned between said N×1 optical switch and said 1×N optical switch.

16. A telecommunications network, comprising:
a first plurality of network elements, said first plurality of network elements generating a first plurality of optical signals on a plurality of input lines;
a second plurality of network elements, said second plurality of network elements operative to receive said first plurality of optical signals on a plurality of output lines; and
an optical matrix protection system that provides connectivity between said first plurality of network elements and said second plurality of network elements, said optical matrix protection system including
a N×1 optical switch;
a 1×N optical switch, an input port of said 1>N optical switch being coupled to an output port of said N×1 optical switch;
a first plurality of optical elements, wherein an $i^{th}$ one of said first plurality of optical elements has an input port coupled to an $i^{th}$ one of a plurality of input lines, a first output port of said $i^{th}$ one of said first plurality of optical elements being coupled to input port i of a N×N switch, a second output port of said $i^{th}$ one of said first plurality of optical elements being coupled to input port i of said N×1 optical switch; and
a second plurality of optical elements, wherein a $j^{th}$ one of said second plurality of optical switches has an output port coupled to a $j^{th}$ one of a plurality of output lines, a first input port of said $j^{th}$ one of said second plurality of optical elements being coupled to output port j of said N×N switch, a second input port of said $j^{th}$ one of said second plurality of optical elements being coupled to output port j of said 1×N optical switch,
wherein upon a failure in a path connecting an optical input port and an optical output port of said N×N switch, said path is rerouted through said N×1 optical switch and said 1×N optical switch using one of said first plurality of optical elements and one of said second plurality of optical elements.

17. The telecommunications network of claim 16, wherein said first plurality of optical elements comprises a plurality of 1×2 optical switches, wherein an $i^{th}$ one of said plurality of 1×2 optical switches has an input port coupled to an $i^{th}$ one of said plurality of input lines, a first output port of said $i^{th}$ one of said plurality of 1×2 optical switches being coupled to input port i of said N×N switch, a second output port of said $i^{th}$ one of said plurality of 1×2 optical switches being coupled to input port i of said N×1 optical switch.

18. The telecommunications network of claim 16, wherein said first plurality of optical elements comprises a plurality of optical splitters, wherein an $i^{th}$ one of said plurality of optical splitters has an input port coupled to an $i^{th}$ one of said plurality of input lines, a first output port of said $i^{th}$ one of said plurality optical splitters being coupled to input port i of a N×N switch, a second output port of said $i^{th}$ one of said plurality of optical splitters being coupled to input port i of said N×1 optical switch.

19. The telecommunications network of claim 16, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

20. The telecommunications network of claim 16, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

21. The telecommunications network of claim 17, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

22. The telecommunications network of claim 17, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

23. The telecommunications network of claim 18, wherein said second plurality of optical elements comprises a plurality of 2×P optical switches, wherein a $j^{th}$ one of said plurality of 2×P optical switches has an output port coupled to a $j^{th}$ one of said plurality of output lines, a first input port of said $j^{th}$ one of said plurality of 2×P optical switches being coupled to output port j of said N×N switch, a second input port of said $j^{th}$ one of said plurality of 2×P optical switches being coupled to output port j of said 1×N optical switch.

24. The telecommunications network of claim 18, wherein said second plurality of optical elements comprises a plurality of optical combiners, wherein a $j^{th}$ one of said plurality of optical combiners has an output port coupled to a $j^{th}$ one of said plurality of output lines, a first input port of said $j^{th}$ one of said plurality of optical combiners being coupled to output port j of said N×N switch, a second input port of said $j^{th}$ one of said plurality of optical combiners being coupled to output port j of said 1×N optical switch.

25. The telecommunications network of claim 16, wherein said N×N switch is a N×N optical matrix switch.

26. The telecommunications network of claim 25, wherein said N×N optical matrix switch comprises N 1×N optical switches and N N×1 optical switches, wherein output ports of said 1×N optical switches are coupled to input ports of said N×1 optical switches.

27. The telecommunications network of claim 16, wherein said N×N switch is an electrical switch having optical input and output ports.

28. The telecommunications network of claim 19, wherein said 2×P optical matrix switches are 2×1 optical matrix switches.

29. The telecommunications network of claim 19, wherein said 2×P optical matrix switches are 2×2 optical matrix switches, wherein a second output port of a 2×2 optical matrix switch is coupled to a signal detector.

30. The telecommunications network of claim 22, further comprising a blocking switch positioned between said N×1 optical switch and said 1×N optical switch.

31. An optical matrix protection system, comprising:
a N×N switch with N inputs and N outputs;
a N×1 optical switch with N inputs and one output;
a 1×N optical switch with one input and N outputs, said 1×N optical switch input being coupled to said output of the N×1 optical switch;
a plurality of input lines;
a plurality of output lines;
a plurality of first optical elements with an input and two outputs, wherein the input of the $i^{th}$ one of said plurality of first optical elements is coupled to the $i^{th}$ one of said plurality of input lines, the first output of said $i^{th}$ one of said plurality of first optical elements being coupled to input i of said N×N switch, the second output of said $i^{th}$ one of said plurality of first optical elements being coupled to input i of said N×1 optical switch; and
a plurality of second optical elements with two inputs and at least one output, wherein an output of $j^{th}$ one of said plurality of second optical switches is coupled to a $j^{th}$ one of said plurality of output lines, the first input of said $j^{th}$ one of said plurality of second optical elements being coupled to output j of said N×N switch, the second input of said $j^{th}$ one of said plurality of second optical elements being coupled to output j of said 1×N optical switch,
wherein upon a failure in a path connecting an input and an output of said N×N switch, said path is rerouted through said N×1 optical switch and said 1×N optical switch using one of said plurality of first optical elements and one of said plurality of second optical elements.

32. The optical matrix protection system of claim 31, wherein said plurality of first optical elements comprises a plurality of 1×2 optical switches, wherein the input an $i^{th}$ one of said plurality of 1×2 optical switches is coupled to the $i^{th}$ one of said plurality of input lines, the first output of said $i^{th}$ one of said plurality of 1×2 optical switches being coupled to input i of said N×N switch, a second output of said $i^{th}$ one of said plurality of 1×2 optical switches being coupled to input i of said N×1 optical switch and wherein said plurality of second optical elements comprises a plurality of 2×P optical switches with two inputs and P outputs, wherein an output of the $j^{th}$ one of said plurality of 2×P optical switches is coupled to a $j^{th}$ one of said plurality of output lines, the first input of said $j^{th}$ one of said plurality of 2×P optical switches being coupled to output j of said N×N switch, the second input of said $j^{th}$ one of said plurality of 2×P optical switches being coupled to output j of said 1×N optical switch.

33. The optical matrix protection system of claim 31, wherein said plurality of first optical elements comprises a plurality of optical splinters, wherein the input of the $i^{th}$ one of said plurality of optical splitters is coupled to an $i^{th}$ one of said plurality of input lines, a first output of said $i^{th}$ one of said plurality optical splitters being coupled to input i of a N×N switch, a second output of said $i^{th}$ one of said plurality of optical splitters being coupled to input i of said N×1optical switch and wherein said plurality of second optical elements comprises a plurality of optical combiners, wherein an output of the $j^{th}$ one of said plurality of optical combiners is a coupled to a $j^{th}$ one of said plurality of output fines, the first input of said $j^{th}$ one of said plurality of optical combiners being coupled to output j of said N×N switch, the second input of said $j^{th}$ one of said plurality of optical combiners being coupled to output j of said 1×N optical switch.

34. An optical switch, comprising:
a N×N switch with N inputs and N outputs;
a N×1 optical switch with N inputs and one output;
a 1×N optical switch with one input and N outputs, said 1×N optical switch input being coupled to said output of the N×1 optical switch;
a plurality of input lines;
a plurality of output lines;
a plurality of first optical elements with an input and two outputs, wherein the input of the $i^{th}$ one of said plurality of first optical elements is coupled to the $i^{th}$ one of said plurality of input lines, the first output of said $i^{th}$ one of said plurality of first optical elements being coupled to input i of said N×N switch, the second output of said $i^{th}$ one of said plurality of first optical elements being coupled to input i of said N×1 optical switch; and
a plurality of second optical elements with two inputs and at least one output, wherein an output of $j^{th}$ one of said plurality of second optical switches is coupled to a $j^{th}$ one of said plurality of output lines, the first input of said $j^{th}$ one of said plurality of second optical elements being coupled to output j of said N×N switch, the second input of said $j^{th}$ one of said plurality of second optical elements being coupled to output j of said 1×N optical switch,
wherein upon a failure in a path connecting an input and an output of said N×N switch, said path is rerouted through said N×1 optical switch and said 1×N optical switch using one of said plurality of first optical elements and one of said plurality of second optical elements.

35. The optical switch of claim 34, wherein said plurality of first optical elements comprises a plurality of 1×2 optical switches, wherein the input an $i^{th}$ one of said plurality of 1×2 optical switches is coupled to the $i^{th}$ one of said plurality of input lines, the first output of said $i^{th}$ one of said plurality of 1×2 optical switches being coupled to input i of said N×N switch, a second output of said $i^{th}$ one of said plurality of 1×2 optical switches being coupled to input i of said N×1 optical switch and wherein said plurality of second optical elements comprises a plurality of 2×P optical switches with two inputs and P outputs, wherein an output of the $j^{th}$ one of said plurality of 2×P optical switches is coupled to a $j^{th}$ one of said plurality of output lines, the first input of said $j^{th}$ one of said plurality of 2×P optical switches being coupled to output j of said N×N switch, the second input of said $j^{th}$ one of said plurality of 2×P optical switches being coupled to output j of said 1×N optical switch.

36. The optical switch of claim 34, wherein said plurality of first optical elements comprises a plurality of optical splitters, wherein the input of the $i^{th}$ one of said plurality of optical splitters is coupled to an $i^{th}$ one of said plurality of input lines, a first output of said is one of said plurality optical splitters being coupled to input i of a N×N switch, a second output of said $i^{th}$ one of said plurality of optical splitters being coupled to input i of said N×1 optical switch and wherein said plurality of second optical elements comprises a plurality of optical combiners, wherein an output of the $j^{th}$ one of said plurality of optical combiners is coupled to a $j^{th}$ one of said plurality of output lines, the first input of said $j^{th}$ one of said plurality of optical combiners being coupled to output j of said N×N switch, the second input of said $j^{th}$ one of said plurality of optical combiners being coupled to output j of said 1×N optical switch.

* * * * *